(12) United States Patent
Ellis et al.

(10) Patent No.: US 9,470,049 B2
(45) Date of Patent: Oct. 18, 2016

(54) HYDRO-PNEUMATIC TENSIONER WITH FLUID RETENTION DEVICE

(71) Applicant: Dril-Quip, Inc., Houston, TX (US)

(72) Inventors: Fife B. Ellis, Houston, TX (US); Steven Hafernik, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 335 days.

(21) Appl. No.: 14/159,814

(22) Filed: Jan. 21, 2014

(65) Prior Publication Data

US 2014/0202327 A1 Jul. 24, 2014

Related U.S. Application Data

(60) Provisional application No. 61/755,309, filed on Jan. 22, 2013.

(51) Int. Cl.

| F15B 15/02 | (2006.01) |
| --- | --- |
| E21B 19/00 | (2006.01) |
| F04B 53/18 | (2006.01) |
| F16J 15/16 | (2006.01) |
| F04B 53/14 | (2006.01) |
| F15B 1/02 | (2006.01) |
| F16J 15/32 | (2016.01) |
| F16J 1/08 | (2006.01) |
| F04B 39/02 | (2006.01) |
| F16L 1/23 | (2006.01) |

(52) U.S. Cl.
CPC ............ *E21B 19/006* (2013.01); *E21B 19/002* (2013.01); *F04B 39/0292* (2013.01); *F04B 53/143* (2013.01); *F04B 53/18* (2013.01); *F15B 1/021* (2013.01); *F15B 15/02* (2013.01); *F16J 1/08* (2013.01); *F16J 15/162* (2013.01); *F16J 15/324* (2013.01); *F16L 1/23* (2013.01)

(58) Field of Classification Search
CPC ...... F15B 15/02; F15B 1/021; E21B 19/002; E21B 19/006; F16L 1/23; F16J 1/08; F16J 15/162; F16J 15/182; F16J 15/324; F04B 53/143; F04B 53/18; F04B 39/0292
USPC .............................. 60/416; 92/157–160, 182
See application file for complete search history.

(56) References Cited

U.S. PATENT DOCUMENTS

| 1,768,633 | A * | 7/1930 | Ries ....................... F16J 15/162 92/112 |
| --- | --- | --- | --- |
| 6,916,025 | B2 * | 7/2005 | Brisson ................ B67D 7/0227 222/648 |
| 7,819,195 | B2 | 10/2010 | Ellis |
| 7,823,646 | B2 | 11/2010 | Ellis et al. |

* cited by examiner

*Primary Examiner* — Logan Kraft
(74) *Attorney, Agent, or Firm* — Baker Botts L.L.P.

(57) ABSTRACT

A cylinder accumulator system is disclosed. The system includes a cylinder comprising a cylinder rod, a cylinder barrel coaxial to the cylinder rod, a cylinder end cap coupled to the cylinder barrel and the cylinder rod, and a cylinder piston assembly disposed within the cylinder barrel. The cylinder piston assembly further includes a dynamic sealing arrangement, which comprises one or more dynamic seals. The system further includes a first annular volume coaxial to the cylinder rod and the cylinder barrel, and a second volume disposed within the cylinder piston assembly. The system also includes a piston disposed within a bore of the second volume and between a hydraulic fluid located on a first side of the piston and a gas media located on a second side of the piston. The system also includes an external high-pressure accumulator, a low-pressure accumulator, and one or more tube manifolds coupling the external high-pressure accumulator and low-pressure accumulator to the cylinder.

20 Claims, 4 Drawing Sheets

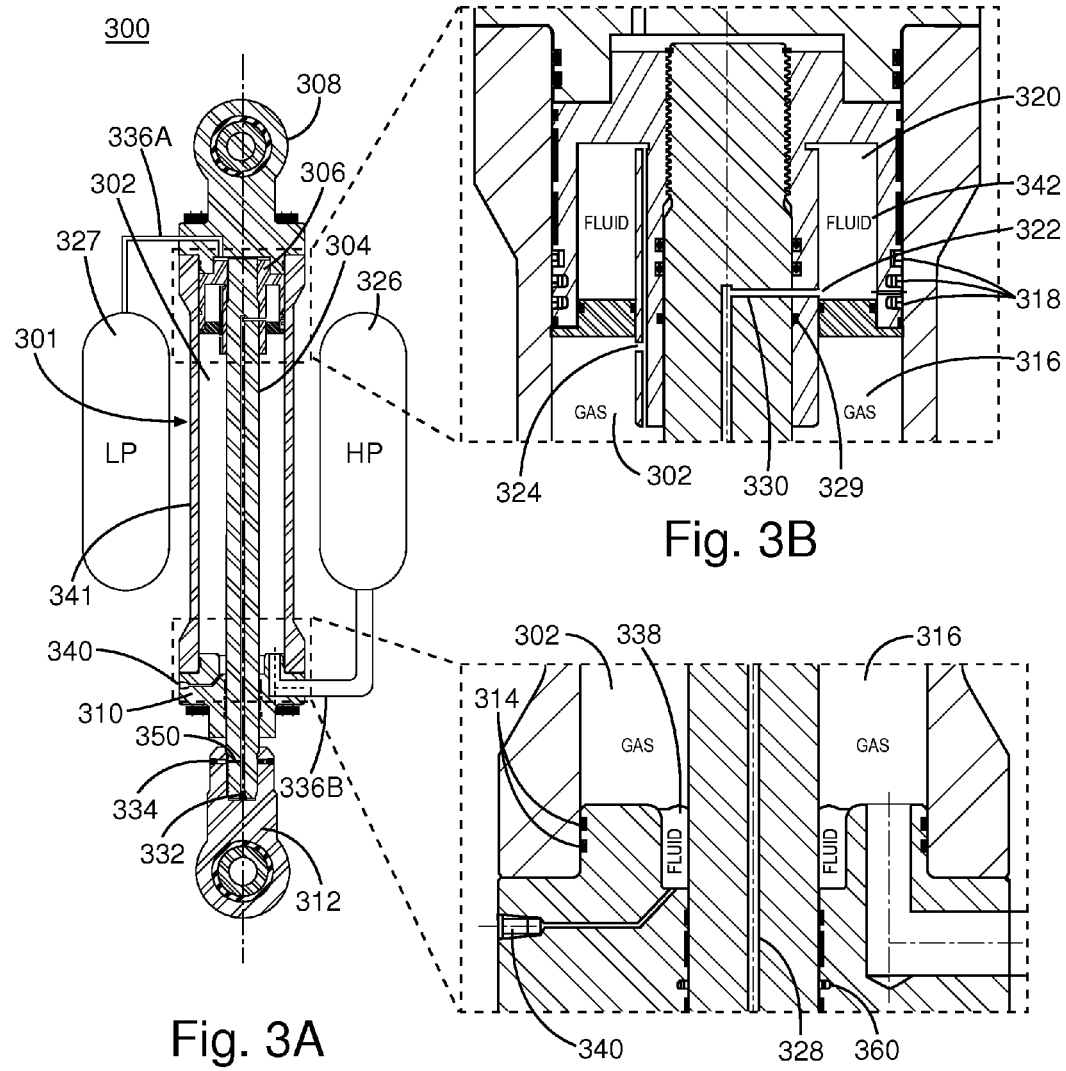

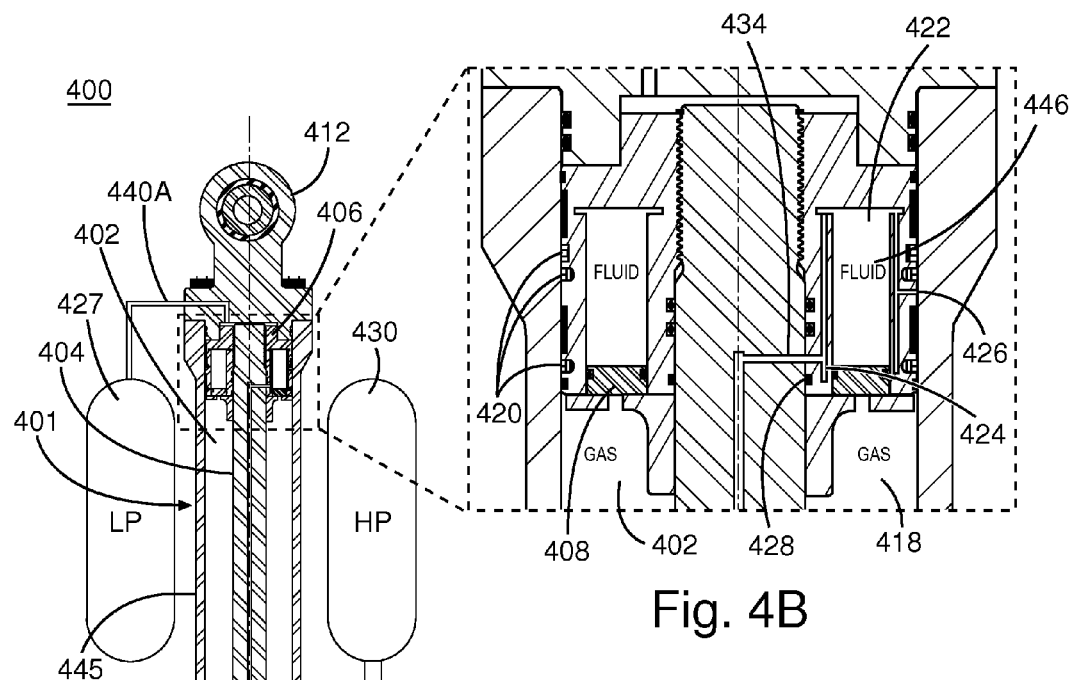
Fig. 4A
Fig. 4B
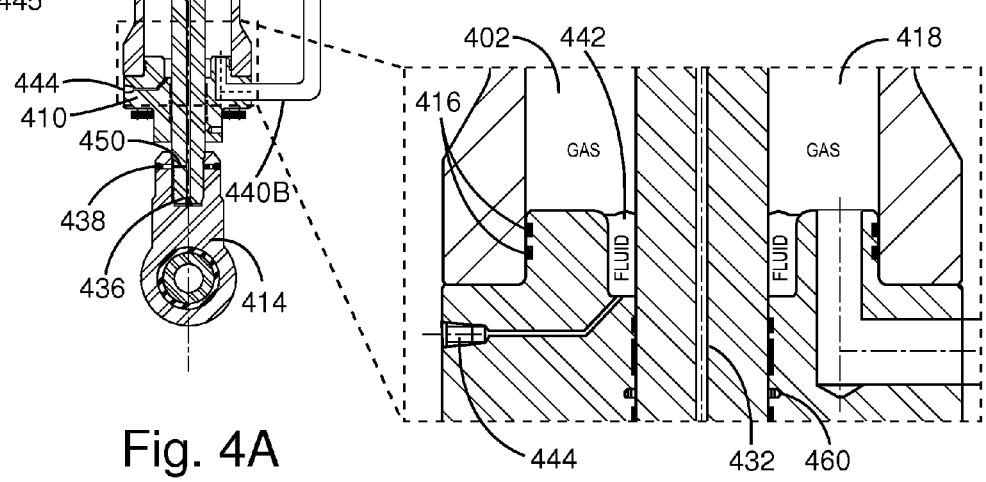
Fig. 4C

HYDRO-PNEUMATIC TENSIONER WITH FLUID RETENTION DEVICE

CROSS-REFERENCE TO RELATED APPLICATION

This application claims the benefit of United States Provisional Application No. 61/755,309, filed Jan. 22, 2013, which is incorporated herein by reference for all purposes.

BACKGROUND

The present invention relates generally to pull-up riser tensioner systems used on offshore floating production and drilling platforms and, more particularly, to a pull-up riser tensioner system with a fluid retention device.

The current technology for cylinders used on riser tensioners is illustrated in FIG. 1. A typical prior art pull-up riser tensioner system 100 includes multiple hydro-pneumatic cylinders 102. The lower ends of the cylinders are attached to a threaded tension ring 104 that is connected to a production or drilling riser 106. The opposite, top ends of the cylinders are connected to the platform structure 108. The cylinders 102 serve to maintain a near constant tension on the production or drilling riser 106 as the platform 108 moves in multiple planes due to wind, waves, platform movements, and other natural events.

A typical prior art cylinder accumulator system 200 is illustrated in FIG. 2. The cylinder accumulator system 200 is comprised of a hydraulic cylinder 202, high-pressure accumulator 204, low-pressure accumulator 206, and various pipes 208 between the accumulators 204, 206 and cylinder 202. The hydraulic cylinder 202 comprises a cylinder piston assembly 210, a cylinder rod 212, cylinder end cap 213, a cylinder head 214, and a cylinder rod extension 215. The high-pressure accumulator 204 serves as a gas "spring." Under normal operation, the high-pressure accumulator 204 holds both hydraulic fluid and a gas media such as nitrogen or compressed air. The size or volume of the high-pressure accumulator 204, relative to the cylinder volume, determines the overall spring rate or stiffness of the cylinder accumulator system 200 as the cylinder accumulator system 200 moves over its stroke range. The low-pressure accumulator 206 serves to maintain a near constant pressure on the piston side of the hydraulic cylinder 202 over the stroke range and maintains a closed system.

Current cylinder technology requires a large volume of hydraulic fluid that is equal to at least 115% of the total cylinder swept volume. The volume of hydraulic fluid is based on the total swept volume plus an additional 15% reserve that is used to account for any small leaks that may occur while in operation. Maintaining this volume is required in order to maintain fluid contact with the dynamic seals that are used on both the cylinder piston assembly and the cylinder rod. Under extreme weather events and vessel offsets, the riser tensioner cylinders can be stroked into the fully extended position which pushes nearly all of the hydraulic fluid into the high-pressure accumulator. The high-pressure accumulator is sized to hold this volume plus the additional gas volume in order to maintain the desired spring constant or stiffness. Depending on the riser stiffness requirements, the high-pressure accumulators can be very large and can present problems with weight, packaging, and cost.

Hydraulic fluid used in tensioners contains additives to improve its performance and add characteristics to the hydraulic fluid, such as corrosion protection. Over time, the hydraulic fluid typically breaks down and must be replaced while the tensioner system is still in service supporting the riser weight. Current cylinder technology requires disconnecting the cylinder from the tension ring, fully extending the rod to force all the fluid out and refilling the cylinder with fluid. This can be a time-consuming process and care must be taken to ensure that the cylinder side of the system is full of fluid with no gas bubbles. Then the cylinder is re-attached to the tension ring and pressured up before the process is repeated for the remaining cylinders. Connecting and disconnecting a cylinder from the tension ring can be a time-consuming process, particularly given that access to the tension ring is limited on many platform structures.

BRIEF DESCRIPTION OF THE DRAWINGS

Some specific exemplary embodiments of the disclosure may be understood by referring, in part, to the following description and the accompanying drawings.

FIG. 3A shows a cross-sectional view of a pull-up cylinder accumulator system, in accordance with a first embodiment of the present disclosure.

FIGS. 3B and 3C show cross-sectional views of the piston arrangement of the cylinder accumulator system of FIG. 3A, in accordance with a first embodiment of the present disclosure.

FIG. 4A shows a cross-sectional view of a pull-up cylinder accumulator system, in accordance with a second embodiment of the present disclosure.

FIGS. 4B and 4C show cross-sectional views of the piston arrangement of the cylinder accumulator system of FIG. 4A, in accordance with a second embodiment of the present disclosure.

Figure 1:
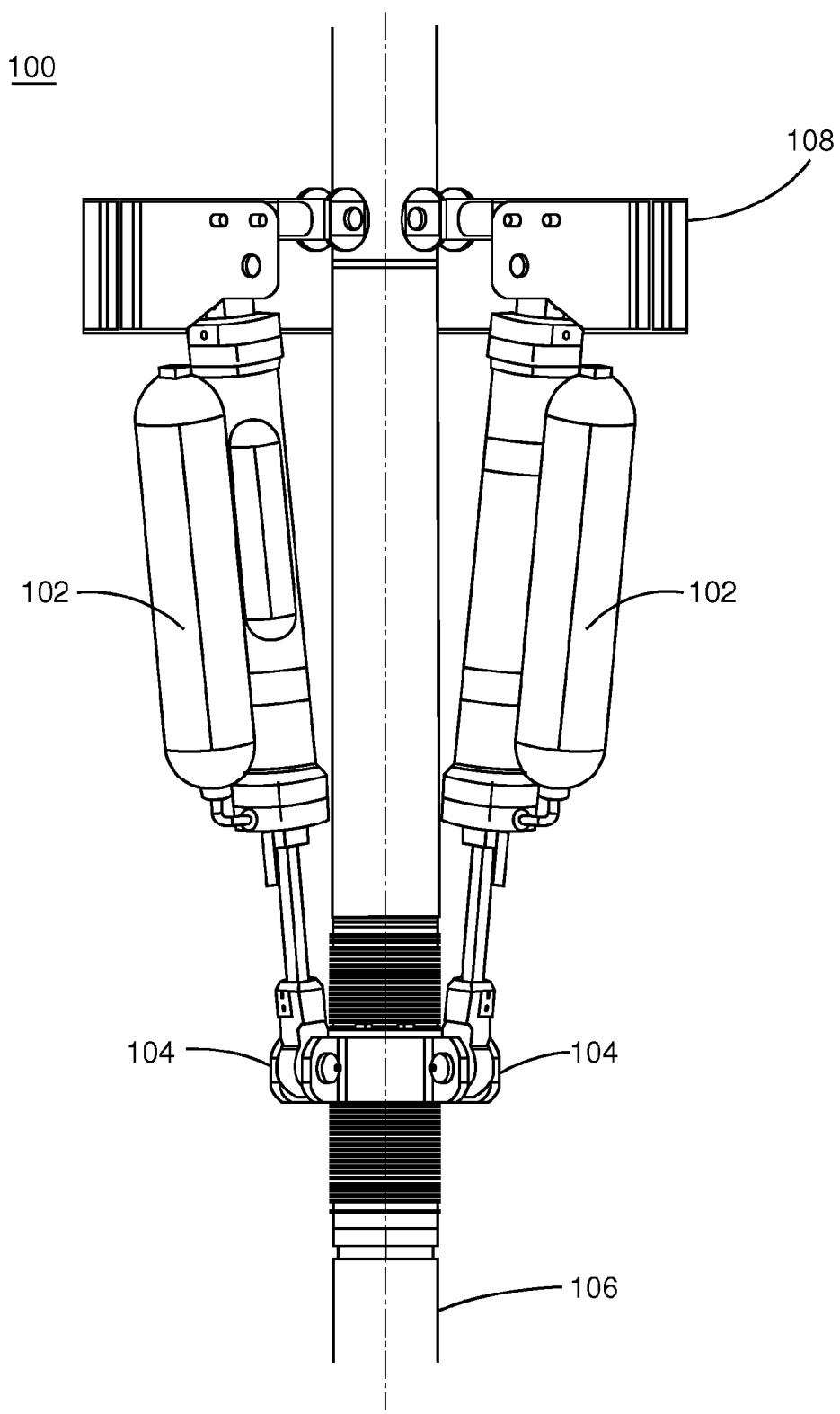
FIG. 1 illustrates a prior art pull-up riser tensioner system.
Figures 2A, 2B:
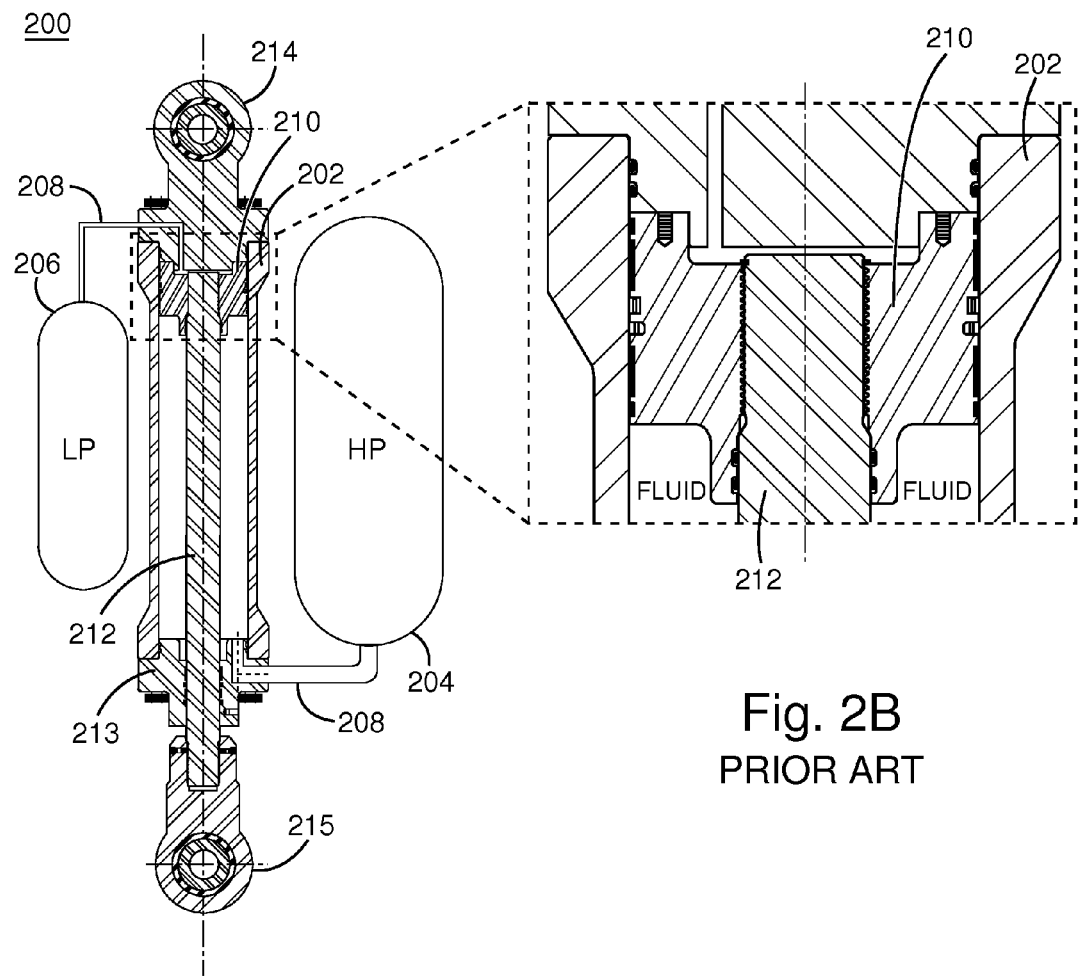
FIG. 2A shows a cross-sectional view of a prior art pull-up cylinder accumulator system.
FIG. 2B shows a cross-sectional view of the cylinder piston arrangement of the prior art cylinder accumulator system of FIG. 2A.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present invention relates generally to pull-up riser tensioner systems used on offshore floating production and drilling platforms and, more particularly, to a pull-up riser tensioner system with a fluid retention device.

The terms "couple" or "couples" as used herein are intended to mean either an indirect or a direct connection. Thus, if a first device couples to a second device, that connection may be through a direct connection, or through an indirect mechanical or electrical connection via other devices and connections.

Illustrative embodiments of the present invention are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention.

As would be appreciated by one of ordinary skill in the art, the cylinder accumulator systems disclosed herein provide a small internal hydraulic fluid dam inside of a hydropneumatic cylinder, which reduces the fluid requirements of the cylinder. By reducing the fluid requirements of the cylinder, additional internal cylinder volume may be utilized to act as an internal high-pressure accumulator. In turn, this may greatly reduce the size of an external, secondary high-pressure accumulator, as compared to high-pressure accumulators of prior art systems.

In one embodiment, the present disclosure provides a pull-up cylinder accumulator system that includes a cylinder with a cylinder rod, a cylinder barrel, a cylinder end cap, and a cylinder piston assembly, a first annular volume coaxial to the cylinder rod and the cylinder barrel, a second volume disposed within the cylinder piston assembly, an external high-pressure accumulator, a low-pressure accumulator, and one or more tube manifolds coupling the external high-pressure accumulator and low-pressure accumulator to the cylinder. In a second embodiment, the present disclosure provides a pull-up cylinder accumulator system that also includes a piston disposed within a bore of the second volume and between a hydraulic fluid located on a first side of the piston and a gas media located on a second side of the piston. The systems disclosed will be discussed in further detail in conjunction with the illustrative embodiments of FIGS. 3A-3C and FIGS. 4A-4C.

Referring to FIGS. 3A-3C, one embodiment in accordance with the present disclosure is illustrated. As shown in FIGS. 3A-3C, the pull-up cylinder accumulator system 300 may include a cylinder 301. The cylinder 301 may further include a cylinder rod 304, a cylinder barrel 341, a cylinder end cap 310, and a cylinder piston assembly 306. The cylinder 301 may also include a cylinder head 308 and a cylinder rod extension 312. The system 300 may further include a first annular volume 302 coaxial to both the cylinder rod 304 and the cylinder barrel 341. The cylinder end cap 310 may be coupled to the cylinder barrel 341 and may be used to close the lower end of the cylinder barrel 341 and may act as a bottom stop. The cylinder head 308 may be coupled to the cylinder barrel 341 and may be used to close the top end of the cylinder barrel 341, serve as a positive up stop, and may provide for attachment of the cylinder accumulator system 300 to a platform structure (not shown). The cylinder piston assembly 306 may be a two-piece assembly, or may be an assembly comprised of multiple pieces. The cylinder rod extension 312 may be used to attach the cylinder accumulator system 300 to a tension ring (not shown). The cylinder end cap 310 and cylinder rod extension 312 may be coupled to the cylinder rod 304, and the cylinder end cap 310 and cylinder rod extension 312 may slide relative to one another. The system 300 may further comprise one or more static seals 314 for sealing a gas media 316 in the first annular volume 302. The gas media 316 may include nitrogen gas, compressed air, or any other suitable gas media known to one of ordinary skill in the art with the benefit of the present disclosure.

In certain embodiments, the pull-up cylinder accumulator system 300 may also comprise a second volume 320. The second volume 320 may be disposed within the cylinder piston assembly 306, minimizing any impact on the cylinder length. The cylinder piston assembly 306 may also include a dynamic sealing arrangement comprising one or more dynamic seals 318 for sealing a hydraulic fluid 342 in the second volume 320. The one or more dynamic seals may be high-pressure dynamic seals. The second volume 320 may serve as a storage container for the hydraulic fluid 342. The second volume 320 may be annular. The dynamic sealing arrangement and/or the one or more dynamic seals 318 may be exposed to the hydraulic fluid 342 in the second volume 320. The hydraulic fluid 342 may be used to lubricate the one or more dynamic seals 318 of the cylinder piston assembly 306. The second volume 320 may comprise a radial supply hole 322. The radial supply hole 322 may be used for initial hydraulic fluid charging as well as providing a means for periodic fluid maintenance and fluid replacement. In certain embodiments in accordance with the present disclosure, the cylinder piston assembly 306 may comprise an axial communication hole 324. The axial communication hole 324 may communicate the gas media 316 to the second volume 320. The radial supply hole 322 and axial communication hole 324 may both communicate with the second volume 320. As would be appreciated by one of ordinary skill in the art with the benefit of the present disclosure, the gas media 316 may be communicated from the first annular volume 302 to the second volume 320, substantially equalizing the pressure in the hydraulic fluid 342 and the gas media 316. A seal 329 located below the radial supply hole 322 on the cylinder piston assembly 306 may prevent the hydraulic fluid 342 from draining out of the second volume 320. As the hydraulic fluid 342 and the gas media 316 experience substantially the same pressure, the seal may experience zero differential pressure.

As would be appreciated by one of ordinary skill in the art, the embodiment illustrated in FIGS. 3A-3C creates a small internal hydraulic fluid dam (i.e., second volume 320), thereby reducing the fluid requirements of the cylinder. The remaining internal cylinder volume (i.e., first annular volume 302) may then be used as a primary high-pressure gas accumulator, thus reducing the size of the secondary high-pressure accumulator 326.

Referring now to FIGS. 4A-4C, a second embodiment in accordance with the present disclosure is illustrated. As shown in FIGS. 4A-4C, the pull-up cylinder accumulator system 400 may include a cylinder 401. The cylinder 401 may further include a cylinder rod 404, a cylinder barrel 445, a cylinder end cap 410, and a cylinder piston assembly 406. The cylinder 401 may also include a cylinder head 412 and a cylinder rod extension 414. The system 400 may further include a first annular volume 402 coaxial to both the cylinder rod 404 and the cylinder barrel 445. The cylinder end cap 410 may be coupled to the cylinder barrel 445 and may be used to close the lower end of the cylinder barrel 445 and may act as a bottom stop. The cylinder head 412 may be coupled to the cylinder barrel 445 and may be used to close the top end of the cylinder barrel 445, serve as a positive up stop, and may provide for attachment of the cylinder accumulator system 400 to a platform structure (not shown). The cylinder piston assembly 406 may be a two-piece assembly, or may be an assembly comprised of multiple pieces. The cylinder rod extension 414 may be used to attach the cylinder accumulator system 400 to a tension ring (not shown). The cylinder end cap 410 and cylinder rod extension 414 may be coupled to the cylinder rod 404, and the cylinder end cap 410 and cylinder rod extension 414 may slide relative to one another. The system 400 may further comprise one or more static seals 416 for sealing a gas media 418 in the first annular volume 402. The gas media 418 may include nitrogen gas, compressed air, or any other suitable gas media known to one of ordinary skill in the art with the benefit of the present disclosure.

In certain embodiments, the pull-up cylinder accumulator system 400 may also comprise a second volume 422. The second volume 422 may be disposed within the cylinder piston assembly 406, minimizing any impact on the cylinder length. The cylinder piston assembly 406 may further a dynamic sealing arrangement comprising one or more dynamic seals 420 for sealing a hydraulic fluid 446 in the second volume 422. The one or more dynamic seals 420 may be high-pressure dynamic seals. The second volume 422 may serve as a storage container for the hydraulic fluid 446. The second volume 422 may be annular. The dynamic sealing arrangement and/or the one or more dynamic seals 420 may be exposed to the hydraulic fluid 446 in the second volume 422. The hydraulic fluid 446 may be used to lubricate one or more dynamic seals 420 of the cylinder piston assembly 406.

In certain embodiments, the pull-up cylinder accumulator system 400 may further include a piston 408 for separating the second volume 422, which may include a hydraulic fluid 446, from the first annular volume 402, which may include the gas media 418. The piston 408 may be an annular piston. As shown in the embodiment illustrated in FIGS. 4A-4C, the piston 408 may be disposed within a bore of the second volume 422 between the hydraulic fluid 446 located on a first side of the piston 408 and the gas media 418 located on a second side of the piston 408, thus separating the hydraulic fluid 446 from the gas media 418. The second side of the piston may be opposite the first side of the piston 408. The cylinder piston assembly 406 may comprise a radial supply hole 424. A second communication hole 426 located at the outer wall of a bore of the second volume 422 may be used to provide hydraulic fluid 446 to the one or more dynamic seals 420 of the cylinder piston assembly 406. A seal 428 located below the radial supply hole 424 on the cylinder piston assembly 406 may separate the hydraulic fluid 446 from the gas media 418. As the hydraulic fluid 446 and the gas media 418 experience substantially the same pressure, the seal may experience zero differential pressure.

As would be appreciated by one of ordinary skill in the art, the embodiment illustrated in FIGS. 4A-4C similarly creates a small internal hydraulic fluid dam (i.e., second volume 422), thereby reducing the fluid requirements of the cylinder. The remaining internal cylinder volume (i.e., first annular volume 402) may then be used as a primary high-pressure gas accumulator, thus reducing the size of the secondary high-pressure accumulator 430.

In certain embodiments in accordance with the present disclosure, the cylinder end cap 310, 410 and the cylinder rod 304, 404 may comprise one or more fluid access ports for adding and/or remove fluids. The cylinder end cap 310, 410 may have a communications port 340, 444 for accessing the lowest point in the cylinder accumulator system 300, 400. In certain embodiments in accordance with the present disclosure, a fluid may be drained through this communications port 340, 444 without stroking the cylinder 301, 401. The cylinder rod 304, 404 may comprise an axial hole 328, 432 and a radial hole 330, 434 located at an upper end of the cylinder rod 304, 404. The axial hole 328, 432 may or may not be coaxial. The axial hole 328, 432 may communicate with the radial hole 330, 434. The axial hole 328, 432 also may be used to provide hydraulic fluid 342, 446 to the second volume 320, 422 located in the cylinder piston assembly 306, 406. The axial hole 328, 432 also may be used for initial hydraulic fluid charging as well as providing a means for periodic fluid maintenance and fluid replacement. This provides an advantage over the prior art because fluid replacement can be done without disconnecting the cylinder accumulator system from the tension ring. A plug 332, 436 may be located at the bottom of the axial hole 328, 432. The plug 332, 436 may be used to contain the hydraulic fluid 342, 446 within the axial hole 328, 432. The cylinder rod 304, 404 may have a second radial hole 350, 450 located at the lower end that communicates with the axial hole 328, 432.

In certain embodiments in accordance with the present disclosure, the cylinder rod extension 312, 414 may be coupled to the bottom of the cylinder rod 304, 404. The cylinder rod extension 312, 414 may provide a mechanical attachment to a tension ring (not shown) of the system. The cylinder rod extension 312, 414 may have a radial hole 334, 438 that communicates with the second radial hole 350, 450 located in the cylinder rod 304, 404. A pair of seals (not shown) adjacent to the second radial hole 350, 450 may serve to contain and channel hydraulic fluid 342, 446 to the second radial hole 350, 450 in the cylinder rod 304, 404.

In certain embodiments, the cylinder accumulator systems 300, 400 may contain a low-pressure accumulator 327, 427 on the blind side of the cylinder piston assembly 306, 406. The low-pressure accumulator 327, 427 may serve to maintain the cleanliness of the system and protect it from environmental contaminants or corrosion. The low-pressure accumulator 327, 427 may be sized to maintain a cushion and may allow a "soft stop" to be engaged when the cylinder fully retracts. The low-pressure accumulator 327, 427 may be coupled to the cylinder 301, 401 via a tube manifold 336A, 440A.

In certain embodiments, a secondary high-pressure accumulator 326, 430 may be located outside of the cylinder (i.e., external high-pressure accumulator). This secondary high-pressure accumulator 326, 430 may be used to store additional high-pressure gas media for the cylinder/accumulator. In certain embodiments, the high-pressure gas media may include nitrogen gas, compressed air, or any other suitable high-pressure gas media known to one of ordinary skill in the art with the benefit of the present disclosure. The secondary high-pressure accumulator 326, 430 may be coupled to the cylinder 301, 401 via a tube manifold 336B, 440B. As shown in FIGS. 3A and 4A, the secondary high-pressure accumulator 326, 430 may be coupled to the cylinder end cap 310, 410 via the tube manifold 336B, 440B. The purpose of the tube manifold 336B, 440B is to communicate and move high-pressure gas between the secondary high-pressure accumulator 326, 430 and the primary accumulator. The primary accumulator may be comprised of the first annular volume 302, 402 of the cylinder accumulator system 300, 400. The first annular volume 302, 402 may change based on the cylinder stroke position. Thus, the secondary high-pressure accumulator 326, 430 may have a fixed volume, whereas the primary accumulator may have a variable volume. As would be appreciated by one of ordinary skill in the art with the benefit of this disclosure, the cylinder stiffness or spring rate is based on the total volume of both the secondary (fixed volume) high-pressure accumulator 326, 430 and the primary (variable volume) accumulator.

In certain embodiments, an axial volume 338, 442 may be located within the cylinder end cap 310, 410. The axial volume 338, 442 may be coaxial and may be annular. The axial volume 338, 442 may be used to lubricate a dynamic sealing arrangement comprising one or more dynamic seals 360, 460 located in the cylinder end cap 310, 410. The one or more dynamic seals 360, 460 may be high-pressure dynamic seals. In addition, the axial volume 338, 442 may serve as a "soft" hydraulic stop during extreme events whereby the cylinder may become fully extended. In certain embodiments, a fluid may be added and/or removed from the coaxial annular volume 338, 442 via the communications port 340, 444 of the cylinder end cap 310, 410. This allows replacing the fluid without disconnecting the cylinder from the tension ring. The fluid is drained and then added through the fluid ports without the need to stroke the cylinder 301, 401 to remove air bubbles as is required with prior art pull-up cylinders. This provides significant time savings when maintenance is required.

As would be understood by one of ordinary skill in the art with the benefit of this disclosure, a method for reducing the total size of a traditional pull-up style tensioner system while improving maintenance time and reducing safety risks is provided by the present disclosure. In certain embodiments, with further reference to FIGS. 3A-4C, the method may include utilizing the first annular volume 302, 402 located between the cylinder barrel 341, 445 and the cylinder rod 304, 404, as an internal gas accumulator. The method may further include creating the second volume 320, 422 within the cylinder piston assembly 306, 406, and minimizing the pressure difference in the second volume 320, 422 and the internal gas accumulator. The method may further include providing a communication path for the hydraulic fluid 342, 446 in the second volume 320, 422 to lubricate the one or more dynamic seals 318, 420 in the cylinder piston assembly 306, 406. Finally, the method may include utilizing the axial hole 328, 432 in the cylinder rod 304, 404 to adjust the amount of the hydraulic fluid 342, 446 in the second volume 320, 422. In certain embodiments, utilizing the axial hole 328, 432 in the cylinder rod 304, 404 to adjust the amount of the hydraulic fluid 342, 446 may comprises adding and/or removing the hydraulic fluid 342, 446 from the second volume 320, 422 without disconnecting the cylinder accumulator system 300, 400 from the tension ring or stroking it to remove any gas bubbles.

As would further be appreciated by one of ordinary skill in the art with the benefit of this disclosure, the pull-up cylinder accumulator system may reduce the size requirements of the external secondary high-pressure accumulator. Specifically, the system may provide for reduced overall cylinder and/or accumulator weight, reduced overall cylinder and/or accumulator cost, and a smaller external cylinder assembly size envelope, which eases installation. In addition, certain embodiments of the present disclosure may reduce the hydraulic fluid volume and provide an easier and safer method for replacing it. A reduction in hydraulic fluid volume may result in reduced cylinder and/or accumulator weight, reduced costs for hydraulic fluid, reduced time to maintain and change out hydraulic fluid, and a reduction in size of service/maintenance cart requirements.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A cylinder accumulator system comprising:
   a cylinder comprising a cylinder rod, a cylinder barrel coaxial to the cylinder rod, a cylinder end cap coupled to the cylinder barrel and the cylinder rod, and a cylinder piston assembly disposed within the cylinder barrel, wherein the cylinder piston assembly comprises a dynamic sealing arrangement comprising one or more dynamic seals;
   a first annular volume coaxial to the cylinder rod and the cylinder barrel;
   a second volume disposed within the cylinder piston assembly;
   an external high-pressure accumulator;
   a low-pressure accumulator; and
   one or more tube manifolds coupling the external high-pressure accumulator and low-pressure accumulator to the cylinder;
   wherein the cylinder piston assembly comprises a communication path by which a gas media is communicated from the first annular volume to the second volume, substantially equalizing the pressure in a hydraulic fluid located in the second volume and the gas media.

2. The system of claim 1, wherein the second volume is an annular volume.

3. The system of claim 1, wherein the cylinder end cap comprises a dynamic sealing arrangement comprising one or more dynamic seals and a fluid access port for one of adding and removing a hydraulic fluid in contact with the dynamic seals.

4. The system of claim 1, wherein the cylinder rod comprises an axial supply hole, and wherein the axial supply hole supplies a hydraulic fluid to the second volume.

5. The system of claim 4, wherein the cylinder piston assembly and the cylinder rod comprise one or more radial supply holes, and wherein the radial supply holes provide communication between the axial supply hole of the cylinder rod and the second volume.

6. The system of claim 1, wherein the communication path comprises an axial communication hole by which the gas media is communicated from the first annular volume to the second volume, substantially equalizing the pressure in the hydraulic fluid located in the second volume and the gas media.

7. The system of claim 1, wherein the dynamic sealing arrangement of the cylinder piston assembly is exposed to a hydraulic fluid in the second volume.

8. The system of claim 1, wherein the communication path comprises an axial communication hole by which the gas media is communicated from the first annular volume to the second volume, maintaining the hydraulic fluid located in the second volume and the gas media at equal pressures through direct contact.

9. The system of claim 1, wherein the cylinder further comprises a cylinder head coupled to the cylinder barrel, and a cylinder rod extension coupled to the cylinder rod.

10. The system of claim 9, wherein the cylinder rod extension comprises a radial hole, and wherein the radial hole communicates with a second radial hole of the cylinder rod.

11. A cylinder accumulator system comprising:
a cylinder comprising a cylinder rod, a cylinder barrel coaxial to the cylinder rod, a cylinder end cap coupled to the cylinder barrel and the cylinder rod, and a cylinder piston assembly disposed within the cylinder barrel, wherein the cylinder piston assembly comprises a dynamic sealing arrangement comprising one or more dynamic seals;
a first annular volume coaxial to the cylinder rod and the cylinder barrel;
a second volume disposed within the cylinder piston assembly;
a piston disposed within a bore of the second volume between a hydraulic fluid located on a first side of the piston and a gas media located on a second side of the piston, wherein the second side of the piston is opposite the first side of the piston;
an external high-pressure accumulator;
a low-pressure accumulator; and
one or more tube manifolds coupling the external high-pressure accumulator and low-pressure accumulator to the cylinder.

12. The system of claim 11, wherein the second volume is an annular volume.

13. The system of claim 11, wherein the gas media comprises at least one of nitrogen gas or compressed air.

14. The system of claim 11, wherein the cylinder rod comprises an axial supply hole, and wherein the axial supply hole supplies a hydraulic fluid to the second volume.

15. The system of claim 14, wherein the cylinder piston assembly and the cylinder rod comprise one or more radial supply holes, and wherein the radial supply holes provide communication between the axial supply hole of the cylinder rod and the second volume.

16. The system of claim 11, wherein the cylinder end cap comprises a dynamic sealing arrangement comprising one or more dynamic seals and a fluid access port for one of adding and removing a hydraulic fluid in contact with the dynamic seals.

17. The system of claim 11, wherein the second side of the piston is in direct contact with the gas media, and wherein the gas media is located in the first annular volume.

18. The system of claim 11, wherein the piston in the second volume is an annular piston.

19. A method for reducing the total size of a traditional pull-up style tensioner system while improving maintenance time comprising:
utilizing a first annular volume located between a cylinder barrel and a cylinder rod as an internal gas accumulator;
creating a second volume within a cylinder piston assembly;
substantially equalizing the pressure in the second volume and the pressure in the internal gas accumulator via a communication path;
providing a second communication path for a hydraulic fluid in the second volume to lubricate one or more dynamic seals in the cylinder piston assembly; and
utilizing an axial hole in the cylinder rod to adjust the amount of the hydraulic fluid in the second volume.

20. The method of claim 19, wherein utilizing the axial hole in the cylinder rod to adjust the amount of the hydraulic fluid comprises one of adding and removing the hydraulic fluid from the second volume.

* * * * *